Patented Feb. 1, 1949

2,460,734

UNITED STATES PATENT OFFICE 2,460,734

ASBESTOS IMPREGNATED WITH TIN OXIDE AND PROCESS OF PRODUCING

Thomas D. Callinan, Pittsfield, Mass., assignor to General Electric Company, a corporation of New York No Drawing. Application October 4, 1944, Serial No. 557,238

2 Claims. (Cl. 117—126)

The present invention comprises improved asbestos products which contain tin oxide. It is the object of my invention to improve the tensile strength of fabricated asbestos articles consisting either substantially wholly of asbestos or of asbestos associated with a substantial amount of a finely divided mineral material, such, for example, as colloidal clay.

The excellent heat-resisting properties of asbestos products are highly desirable for electrical insulation purposes. However, for some forms of electrical insulation, such for example as tapes to be applied by winding upon conductors, it is desirable that such asbestos products should have higher tensile strength.

Heretofore, the tensile strength of asbestos products has been improved by impregnation with various organic resins and varnishes. The introduction of such combustible material, reduced the fireproof character of the asbestos products. Attempts to impregnate asbestos products with dispersions of inorganic material in a liquid medium have not been successful. It was found that the treatment of the asbestos products with such dispersions formed merely superficial coatings and that little, if any, penetration had occurred.

In accordance with my present invention asbestos products have tin oxide dispersed therein whereby the tensile strength is increased and the insulating properties are improved.

I have discovered that dispersions in water, or other liquid medium, of tin oxide can be caused to diffuse into asbestos products, and that its presence upon and in the asbestos fibers throughout the asbestos products results in a marked increase of tensile strength of such products. Also, the electrical properties, and in particular the power factor of the asbestos products, are improved by the presence of the tin oxide. Tin oxide also may be introduced by impregnating asbestos with tin chloride, or other soluble tin compound, and reacting said compound in situ with an alkali, preferably ammonia. The tin oxide may be introduced into a prefabricated asbestos product, or, alternatively, may be introduced into the pulp or furnish from which the asbestos product is fabricated.

A freshly prepared aqueous solution of stannic chloride should be employed for the preparation of the tin oxide. In such a freshly prepared solution alpha stannic acid is formed upon standing by hydrolysis. The alpha form of the oxide is a readily dispersible hydrous solid. For example, a solution containing stannic oxide in the alpha or sol state may be prepared by dissolving four parts by weight of stannic chloride in 100 parts of water and permitting the solution to stand for about one hour.

Asbestos sheet material may be impregnated with the alpha stannic oxide solution which results. The impregnated material is heated to about 60° C, at which temperature the excess water is vaporized and the alpha form of stannic oxide is transformed to the less soluble beta form of the oxide, the long chain cross-linked compounds of tin oxide being formed.

The freshly prepared alpha stannic oxide is believed to have a short molecular structure which may be exemplified by the formula:

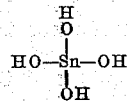

This alpha oxide spontaneously on standing becomes converted to the beta stannic oxide and some polymerization occurs. This change may be represented as follows:

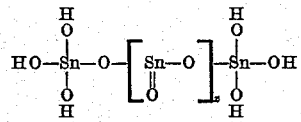

Complete dehydration results in a higher degree of polymerization and more stable compound of greater molecular length. Water leaves the molecules as represented by the formula

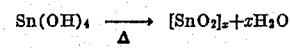

By this treatment the thickness and density of asbestos sheet material is increased but very little. The tensile strength is increased nearly four-fold. The flexibility of the sheet material is not materially decreased. Its insulating properties are improved. The dielectric strength is increased from 80 to 450 volts per mil. The power factor is materially reduced.

Even more advantageously the alpha stannic oxide in the sol state may be associated with an aqueous suspension of asbestos and bentonite, or other colloidal clay, from which sheet material may be made on a paper-making machine. Such material is described in a copending application Serial No. 370,807, filed December 19, 1940, by Theodore R. Walters, now abandoned. Asbestos fibers in a state of fine subdivision are intimately mixed with colloidal clay in a relatively large amount of water. Suitable proportions of these two ingredients comprises 20 to 30 parts of clay to 80 to 70 parts of asbestos. A suitable furnish may comprise by weight 500 parts of water; two parts of purified and disintegrated asbestos and 0.3 part of purified bentonite from which grit and components having a diameter greater than 250 Angstroms have been removed. In order to precipitate the colloidal clay on the fiber, an electrolyte is added to the furnish. Five parts of a 7.5 per cent aqueous copper acetate solution is suitable.

These ingredients are thoroughly mixed by agitation. Two parts by weight of stannic chloride are added and agitation is continued for 15 minutes. The stannic chloride is hydrolyzed and the resulting alpha stannic oxide becomes deposited on the asbestos fiber. This oxide is not merely mechanically entrained with the asbestos and colloidal clay. It becomes bound to the asbestos by reason of the opposite electric charges of the asbestos and the tin oxide. The pH of the dispersion falls from 8.3 to 6.8. The tin oxide cements the asbestos fibers to one another. The reactive nature of the asbestos with respect to the tin oxide results in the effective strengthening of the asbestos products.

When such a modified furnish is deposited on the web of a paper-making machine, the drainage rate of the deposited web, or layer of fiber, is not adversely affected. The web which is deposited on the screen of the machine is dried and subjected to a temperature in the range of 60° C. to 100° C., thereby transforming the tin oxide from the alpha to the beta state. The tensile strength of the final product is about six-fold higher than the tensile strength of a material which is unassocated with tin oxide but which otherwise is similar.

In a copending application Serial No. 557,237, now Patent No. 2,451,805, granted October 19 1948, filed concurrently herewith, I have described and claimed asbestos products containing water-soluble oxides of various metals produced in situ by a chemical reaction occurring within such products after their impregnation with a metallic salt. By the method of said prior application, asbestos products may be impregnated with a solution of tin chloride, and, upon drying, treated with a suitable reagent, such as ammonia or an amine, whereby tin oxide is deposited upon the asbestos fibers. A range of tin chloride solutions from 5 per cent to saturation may be used for the impregnation.

What I claim as new and desire to secure by Letters Patent of the United States is:

1. A flexible, insulating paper consisting of from 20 to 30 parts colloidal clay and 80 to 70 parts asbestos fiber, and impregnated with tin oxide dispersed throughout said paper and cementing the asbestos fibers to one another, said paper having a higher tensile strength than a similar paper which is unassociated with tin oxide.

2. The method of improving the tensile strength and dielectric properties of a flexible asbestos paper consisting of 80 to 70 parts asbestos and 20 to 30 parts of clay, which consists in impregnating said paper with an aqueous solution of alpha stannic oxide and heating the impregnated paper to about 60 to 100° C. to convert the alpha oxide to the beta form of the oxide.

THOMAS D. CALLINAN.

REFERENCES CITED

The following references are of record in the file of this patent:

UNITED STATES PATENTS

| Number | Name | Date |
|---|---|---|
| 1,307,857 | Frood | June 24, 1919 |
| 1,798,996 | Batcheller | Mar. 31, 1931 |
| 1,798,997 | Batcheller | Mar. 31, 1931 |
| 2,147,057 | Platt et al. | Feb. 14, 1939 |
| 2,354,876 | Owens | Aug. 1, 1944 |